Figure 1:
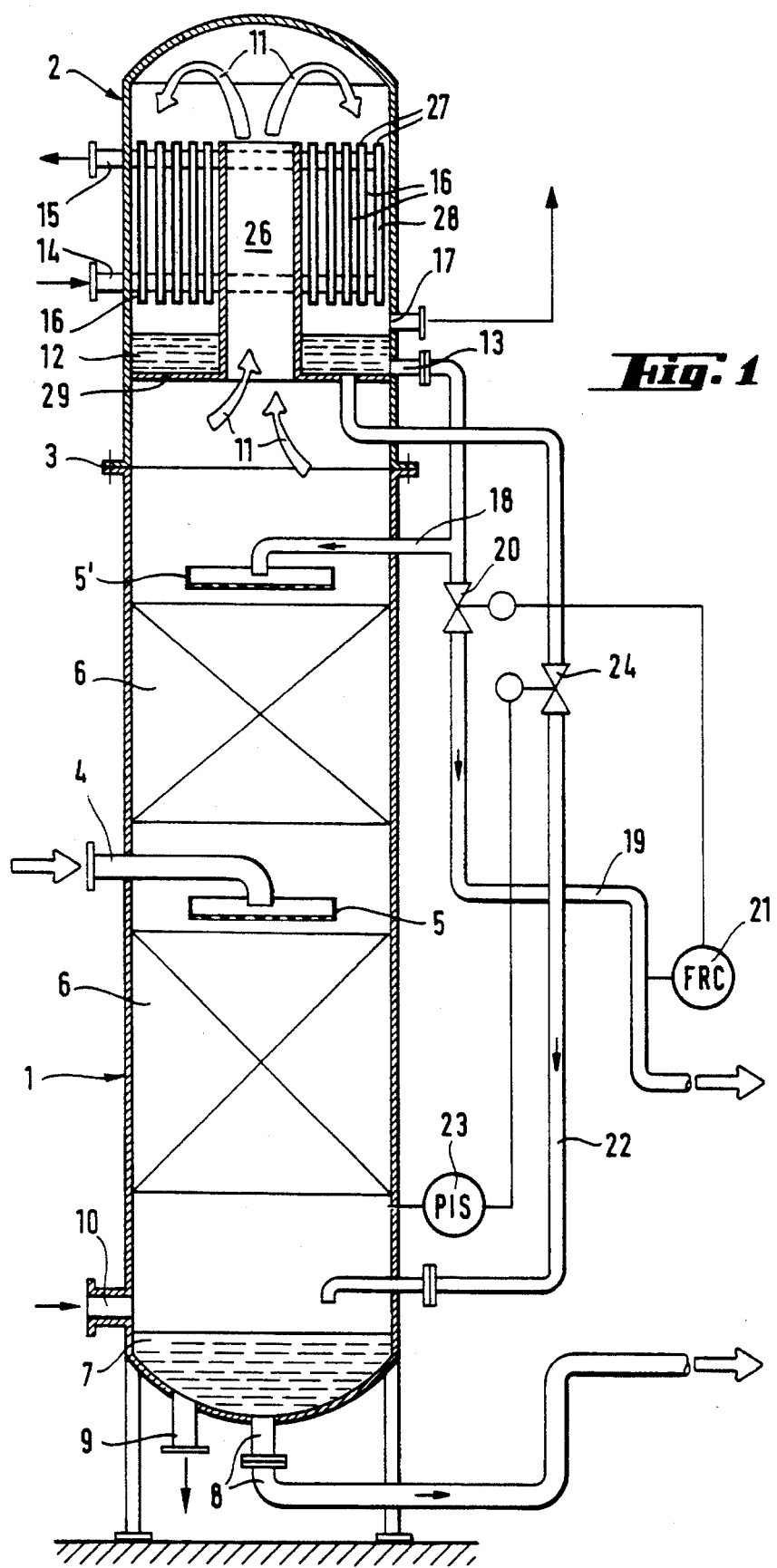

United States Patent [19]

Roth et al.

[11] Patent Number: 5,507,356
[45] Date of Patent: Apr. 16, 1996

[54] COLUMN HAVING INTEGRATED HEAT EXCHANGER

[75] Inventors: Peter M. Roth, Eppstein/Ts; Siegfried Rewitzer, Ihrlerstein, both of Germany

[73] Assignee: Hoechst Aktiengesellschaft, Germany

[21] Appl. No.: 178,934

[22] Filed: Jan. 7, 1994

[30] Foreign Application Priority Data

Jan. 7, 1993 [DE] Germany .......................... 43 00 131.9

[51] Int. Cl.$^6$ ........................................................ F28F 3/00
[52] U.S. Cl. ........................... 165/111; 165/166; 62/36; 202/158; 196/100
[58] Field of Search ........................... 165/166, 111; 62/36; 202/158; 196/100

[56] References Cited

U.S. PATENT DOCUMENTS

| | | |
|---|---|---|
| 2,070,100 | 2/1937 | Twomey . |
| 2,112,563 | 3/1938 | Forncook ........................... 165/111 |
| 2,183,956 | 12/1939 | Campbell et al. ................ 165/111 |
| 2,921,774 | 1/1960 | Glasgow et al. ................... 165/166 |

FOREIGN PATENT DOCUMENTS

| | | |
|---|---|---|
| 1551583 | 6/1970 | Germany . |
| 1619701 | 12/1970 | Germany . |
| 4019991 | 1/1992 | Germany . |

OTHER PUBLICATIONS

DEG Engineering, Vollgeschweisste Kompakt–Warmetauscher, 1993.
Kirschbaum, E., *Destillier–und Rektifiziertechnik*, Berlin, Springer Verlag, 1969, pp. 148–167 & 470–475.
*Ullmanns Encyklopadie der technischen Chemie*, 4th Ed., vol. 2, Verlag Chemie GmbH, Weinheim/Bergstr., p. 519.
Zitzmann, B., *CAV*, pp. 22–26 & 79 (1985).

*Primary Examiner*—A. Michael Chambers
*Attorney, Agent, or Firm*—Connolly & Hutz

[57] ABSTRACT

Column having integrated heat exchanger

A column is described including a column body (1) and at least one heat exchanger (2) installed directly on the column head. This heat exchanger is a plate heat exchanger which is specially arranged so that the condensing vapors and the condensate (12) generated on the exchanger surface move in one direction.

A further embodiment of the invention relates to a column which contains a column body (1) and at least one plate heat exchanger installed between two trays and/or packing beds within the column, which plate heat exchanger is operated as a condenser and is situated within a collecting vessel (29) open at the top.

A third embodiment of the invention relates to a column which includes a column body (1) and at least one plate heat exchanger (2), which is operated as an evaporator, and which is installed within the column between two trays and/or packing beds and/or in the bottom.

The column according to the invention is distinguished by a space-saving construction.

16 Claims, 5 Drawing Sheets

COLUMN HAVING INTEGRATED HEAT EXCHANGER

The present invention relates to a column having a specially installed and configured heat exchanger.

Columns for separating substance mixtures are used in many areas of engineering, for example in chemical engineering. Such columns can be for example distillation columns, rectifying columns and desorption columns; these can be operated continuously or discontinuously.

These columns have in common the fact that the ascending overhead vapors are condensed and/or cooled after leaving the column. The structure in principle of a column is depicted for example in Ullmanns Encyclodpädie der technischen Chemie [Ullmann's Encyclopedia of Industrial Chemistry], 4th revised and expanded edition, Volume 2, Verfahrenstechnik I (Grundoperationen) [Process Engineering I (Unit Operations)], headword "Distillation", p. 519, Verlag Chemic (1972).

Cooling and/or condensing of the overhead vapors proceeds in so-called condensers, which are in general configured as so-called tube bundle heat exchangers; these condensers are conventionally installed at the side beneath the column head.

This arrangement is associated with a high expense, for example for piping, extension compensation, pumps or receivers, and causes additional running operation costs. In addition, this solution requires a high space requirement and causes a relatively high pressure drop, which has a consequence, in particular for vacuum operation of the column, a higher rating of the pumps and thus increased capital costs.

It is also known to instal tube bundle heat exchangers directly on the column head. Such embodiments are described in the textbook ""Destillier- und Rektifiziertechnik [Distillation and Rectification Technology]" by E. Kirschbaum, 4th new revised edition, Springer Verlag (1969), p. 410 and pp. 472–473. The exchangers depicted are tube bundle heat exchangers having tubes arranged horizontally or perpendicularly to the direction of flow of the overhead vapors. In these columns, the ascending overhead vapors are conducted in such a way that they move in counter-current to the condensate. Moreover, these heat exchangers are operated as so-called dephlegmators, i.e., the ascending overhead vapors are not completely condensed, but the heat exchanger on the one hand serves for generating the reflux and on the other hand adopts an additional separation function. U.S. Pat. No. 2,070,100 describes a further embodiment of a column including the use of a tube bundle heat exchanger.

The use of spiral heat exchangers as dephlegmators on column heads is described in CAV, 1985, pp. 22–27.

It has been shown that during operation of the column, a counter-current flow of the overhead vapors to be condensed and of the condensate can lead to damming and thus to operating faults; this can occur in particular if the column is operated under vacuum. In order to avoid such damming in the case of counter-current flow of the overhead vapors to be condensed and of the condensate, conventional tube bundle heat exchangers must be dimensioned appropriately large, as a result of which space-saving solutions are not possible.

In addition, it has already been proposed to carry out a specific condensation and evaporation in the column. A saving in energy or an improved separation effect of the column is possible by such measures. The stepwise heat transfer inside rectification columns is described in the textbook "Energetische Analyse von Stoff übertragungsprozessen [Energetic Analysis of Mass Transfer Processes]", pp. 62–63, Verlag für Grundstoffindustrie (Leipzig). Concrete realizations of such a column are not described there. The use of plate heat exchangers in seawater salination plants is disclosed by DE-A-4,019,991. The columns described there do not have any trays or packing beds.

It has now been found that the abovementioned disadvantages can be avoided if the column is equipped with compact plate heat exchangers which are installed in a specific manner in the column head and/or in the column body. In particular, a compact and weight-saving construction can be realized with the column according to the invention.

An embodiment of the invention relates to a column including a column body and at least one heat exchanger installed directly on the column head, which comprises the heat exchanger being a plate heat exchanger which is constructed in such a way that the overhead vapors (11) ascending from the column body (1) are conducted through an internal cavity (26) and are deflected through 180° at the top of the arrangement and then impinge on the condenser plates (16), where they precipitate as condensate (12) and move downwards together with the vapors to be condensed, or the plate heat exchanger being mounted asymmetrically in the upper part of the column so that the overhead vapours (11) ascending from the column body (1) are conducted past the heat exchanger (2) and are deflected through 180° at the top of the arrangement and then impinge on the condensor plates (16), where they precipitate as condensate and more downwards together with the vapours to be condensed.

For the case that the plate heat exchanger is operated as a condenser, this is arranged in such a way that the condensing vapors and the condensate generated on the exchanger surfaces move in one direction. When installed in the bottom, the plate heat exchanger is operated as an evaporator.

A further development of the invention relates to a column including a column body and at least one heat exchanger installed between two trays and/or packing beds within the column, which heat exchanger is operated as a condenser, comprising the heat exchanger being a plate heat exchanger which is integrated into the column body (1) within a collecting vessel (29) open at the top between two trays (30) and/or packing beds in the interior of the column shell (40), so that the vapors (11) ascending from the lower trays and/or packing beds are conducted past the heat exchanger (2) and are deflected at least in part by 180° at the tray or packing lying above, and then impinge onto the condenser plate (16) where they precipitate as condensate (12) and move downwards together with the vapors to be condensed.

A further development of the invention relates to a column including a column body and at least one heat exchanger installed within the column, which heat exchanger is operated as an evaporator or as a cooler, which comprises the heat exchanger being a plate heat exchanger which is installed between two trays and/or packing beds within a collecting vessel open at the top and/or is installed in the bottom.

In these developments of the column according to the invention, the vapors to be condensed and the condensate move in one direction, whereas in the development as an evaporator, the vapors formed leave the collecting vessel open at the top in the direction of the tray lying above or the packing bed lying above. The supply of the evaporator with liquid is carried out via a feed line which passes liquid into the collecting vessel from the parts of the column lying above or from outside.

In a further development of the invention, liquid can also be passed into the collecting vessel from the parts of the column lying above and can be cooled by the heat exchanger. The cooled liquid then flows away via the collecting vessel open at the top in the direction of the parts of the column lying beneath. This variant is suitable in particular in the case of absorption columns.

The operation of the column according to the invention having heat exchangers installed between two trays or packing beds within the column permits the specific heat removal and/or heat supply within the column. It is possible by these measures to save energy in a specific manner or to achieve an improved separation effect. In addition to the saving of heating energy, this embodiment also enables the utilization of hitherto unavailable waste heat sources at a low temperature level; in addition, the coolant consumption can be reduced, since, for example, coolant water can be used at various temperatures. Even in the case of side take-off of vapors or liquids, an intermediately connected heat exchanger can be advantageously used.

The column according to the invention can be used for any applications for which columns are conventionally used, for example to carry out chemical reactions, but preferably for separating substance mixtures, in particular liquid mixtures.

The column according to the invention can be designed as desired and be matched to the intended application.

Examples of columns to be used according to the invention are tray columns having any desired type of trays, such as sieve trays, bubble-cap trays, valve trays, tunnel trays or centrifugal trays, or packed columns having any desired types of packings, such as Raschig rings, Pall rings, Berl saddles, Intalox saddles or Interpack bodies, or else columns specially designed for vacuum operation, such as wetted-wall columns, columns having Sulzer packings or thin-film rectifiers.

The heat exchanger used according to the invention must be of a compact construction such that installation directly on the column head or within the column body is possible. For this purpose, plate heat exchangers are suitable. These heat exchanger types are already distinguished, without additional constructional measures, by a compact structure. They are described, for example, in Ullmann's Encyclopedia of Industrial Chemistry, Fifth completely revised edition, Volume B3, Unit Operations II, headword "Heat Exchange", pp. 2-10 to 2-17, Verlag Chemie (1988).

The heat exchanger must be arranged in the head of the column in such a way that the condensing vapors and the condensate generated on the exchanger surfaces move in one direction. For this purpose, the overhead vapors ascending from the column are passed upwards past the heat exchanger surfaces and are conducted by deflection onto these heat exchanger surfaces where they are conventionally completely condensed. If uncondensable substances, for example gases, are present in the vapors, better condensation can be achieved by downstream connection of one or more separately cooled heat exchangers.

Plate heat exchangers have a significantly higher heat exchange surface area per unit volume than is usual with conventionally used tube bundle exchangers. This surface area, based on the unit volume, is generally several times greater in plate heat exchangers than in tube bundle heat exchangers.

In addition, the heat transition coefficient in plate heat exchangers is at least as good as—generally markedly better than—the heat transition coefficient of tube bundle heat exchangers.

A further advantage of plate heat exchangers in comparison with tube bundle heat exchangers can be seen in the markedly lower pressure drop of the former exchanger type.

The column according to the invention is therefore suitable in particular for vacuum operation and therefore preferably has at least one connection to a vacuum system.

The invention also relates to the use of plate heat exchangers as condensers or evaporators for the direct installation between two trays and/or packing beds and/or in the bottom of a column or on a column head, in particular as condensers for cooling and/or condensing vapors which result in column heads.

Thermal expansions and the associated stresses are compensated for in a simple manner by the column according to the invention.

The column according to the invention is described by way of example in FIGS. 1, 2a, 2b, 3 and 4.

In FIG. 1, an embodiment of the column according to the invention is depicted in longitudinal section.

Figure 2A:
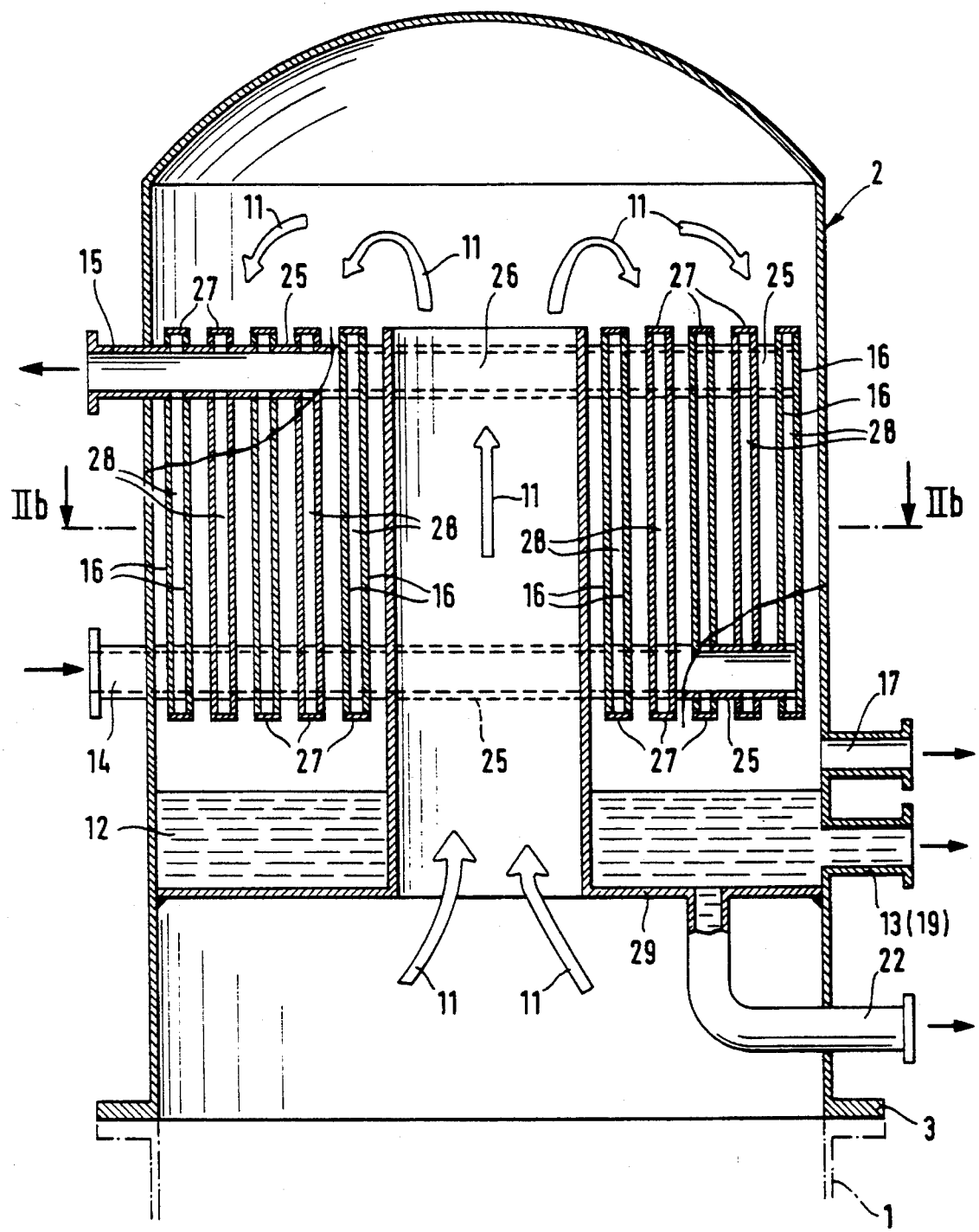
Figure 2B:
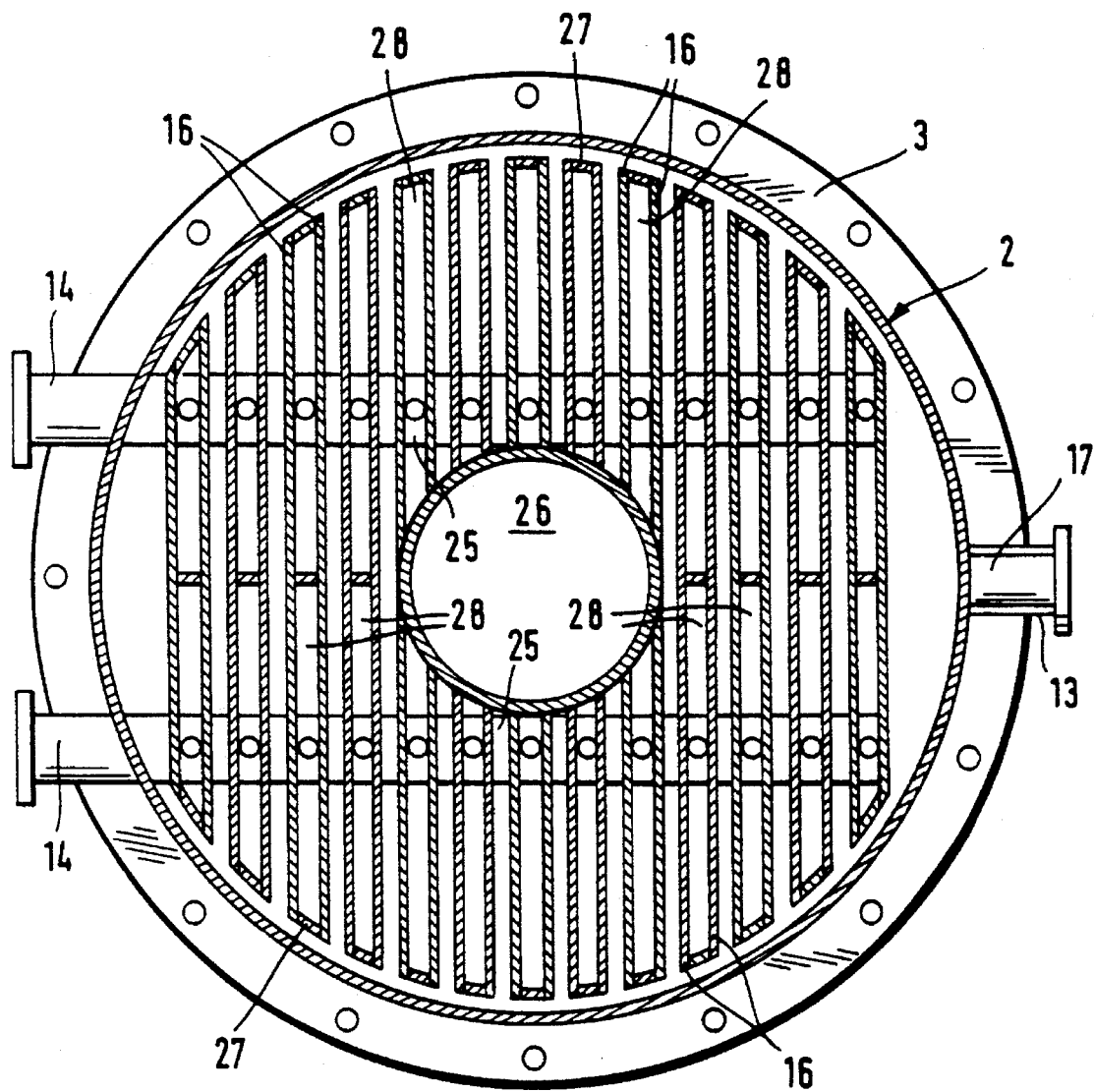

In FIG. 2a, an embodiment of a plate heat exchanger is depicted in longitudinal section; in FIG. 2b this condenser is depicted in cross section.

Figure 3:
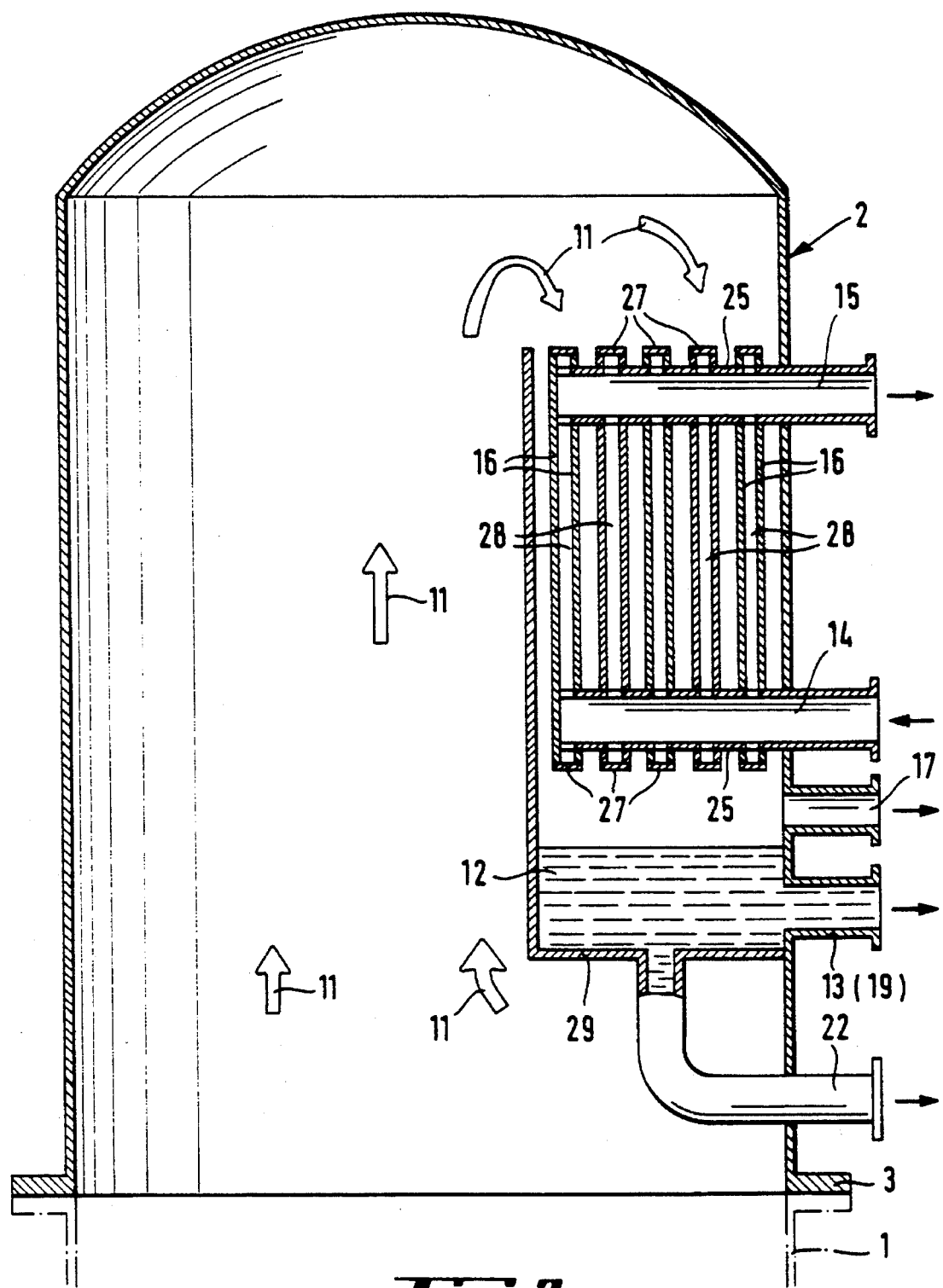

In FIG. 3, the asymmetric arrangement of a plate heat exchanger is depicted in longitudinal section.

Figure 4:
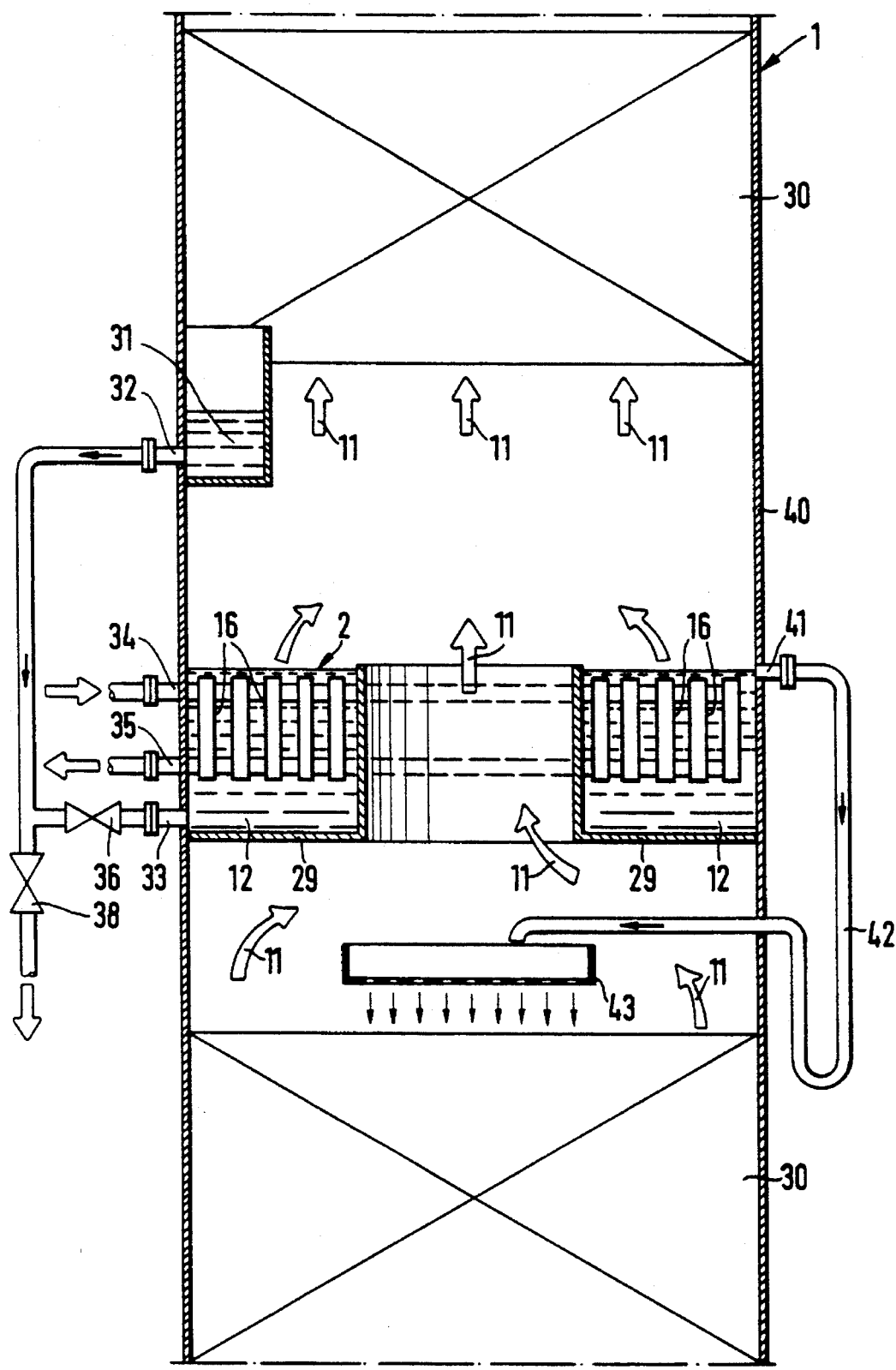

FIG. 4 depicts an embodiment of the column according to the invention, in which a plate heat exchanger is installed symmetrically between two trays or packing beds within the column; in the form depicted, this heat exchanger can be operated as a condenser or as an evaporator or as a liquid cooler.

The column depicted in FIG. 1 has a column body (1) which contains an attached heat exchanger (2), which is operated as a condenser. The two components are joined by a joint (3), for example by a flange joint or by a weld joint. The column body (1) has, halfway up, a feed (4) for the liquid mixture to be separated, which opens out into a distributor tray (5).

The feed of the liquid can also be carried out at another position of the column, for example in the bottom. In addition, multiple feed is possible.

The column body (1) is—as is conventional—provided with trays or packings (6). The liquid mixture introduced via the feed (4) into the column is separated in the column into higher-boiling and downwards-moving constituents and into lower-boiling and upwards-moving constituents. In the lower part of the column is situated the bottom product (7), which can be removed from the column via the outlet (8). The heating of the column is performed by heating the bottom product (7), which is conducted for this purpose via the feed and discharge lines (10) and (9) via a heat exchanger (not shown).

The heating can be performed indirectly, e.g. via a heat exchanger, or directly, e.g. via direct steam via feed line (10). Furthermore, the column can be operated using gas, in particular inert gas (stripper). If the column is operated as an absorber column, the exhaust air to be purified can be introduced via the feed line (10).

The ascending overhead vapors (11) are cooled in the heat exchanger (2) and precipitate as condensate (12) for example in the collecting vessel (29). This condensate can be removed from the column via the outlet (13). The heat exchanger (2) has feed and discharge lines (14) and (15) for the coolant medium, generally water. In the drawing, the heat exchanger (2) is depicted as a plate heat exchanger. The condensation of the overhead vapors (11) proceeds at the condenser plates (16). In addition, the heat exchanger (2) has an orifice (17) for aerating or venting the column; this orifice can also serve as a vacuum connection. This orifice (17) is preferably situated above the heat exchanger surfaces (not shown) and is isolated from the upper head space by a suitable construction, so that the ascending overhead vapors must first pass through the heat exchanger (2) and do not pass directly into the orifice (17).

The condensate (12) can be returned in whole or in part to the column body (1). This serves the setting of the reflux ratio known per se. For this, some of the condensate (12) is conventionally returned via the reflux line (18) to the upper part of the column body; this line preferably opens out into a distributor tray (5').

In a particularly preferred undepicted embodiment, the reflux line (18) is led out separately from the collecting vessel (29) and passed via a siphon to the distributor tray (5'). This embodiment prevents draining of the collecting vessel (29) and permits a simplified measurement of the amount of liquid returned.

The ratio between the returned portion of the condensate and the portion of the condensate removed from the column via the line (19) is expediently monitored by a control circuit (21), for example by a flow recorder controller (FRC), and set via a valve (20).

In a particularly preferred embodiment of the column according to the invention, a further reflux line (22) is provided. Liquid is preferably introduced into the bottom in an open manner (as shown), but it can also be introduced by a submerged feed.

This reflux line (22) permits flooding or dilution of the bottom product (7) in the event that an explosive mixture forms in the interior of the column or there is the risk of the formation of such a mixture. Specific addition of condensate (12) can change the composition of the bottom product (7) and thus also the composition of the vapor phase and liquid phase in the column. This embodiment of the column according to the invention permits control of the vapor phase in a simple manner and operation outside the explosion limits of the vapor mixture, for example in the separation by distillation of mixtures of water and N-methylpyrrolidone, or of water and dimethylformamide. The monitoring of the vapor space at risk from explosions can be carried out by a pressure meter (23), for example a pressure indicator switch (PIS). When an upper limit value is reached as a result of a leak in the vacuum column and entry of air caused thereby, the valve (24) opens and floods or dilutes the bottom product (7) with condensate (12) from the column head via a reflux line (22).

In FIG. 2a, a preferred design of the plate heat exchanger to be used according to the invention is shown in longitudinal section. The overhead vapors (11) ascending from the column body are precipitated at the plates (16) and are collected as condensate (12) in the lower part of the heat exchanger (2) in a collecting vessel (29). The take-off of condensate (12) is performed via the outlet (13).

In a preferred embodiment not shown here, a reflux line (18) is provided which—as described in FIG. 1—is preferably constructed as a siphon line.

The plates (16) are cooled via a coolant, which is passed via pipe (25) to the individual plates (16). The heat exchanger (2) is supplied with coolant via the feed and outlet lines (14) and (15). The plates (16) in the form shown are each arranged in pairs and are welded to a spacer (27) at the longitudinal ends. In this manner, an interior cavity (28) results between each plate pair, through which cavity the coolant is passed.

In a preferred embodiment not shown here, one or more plate pairs situated at the shell are supplied with coolant separately and serve as after coolers.

Pressure equalization in the column can be produced via an aeration or venting orifice (17); this can also be used as a vacuum connection. As described in FIG. 1, this orifice is preferably installed above the heat exchanger.

In the embodiment shown, the overhead vapors (11) ascending from the column body are conducted through an interior cavity (26) and are deflected at the top of the arrangement through 180°. The vapors then impact the condenser plates (16) where they precipitate as condensate (12); vapors and condensate then move in one direction downwards, the vapors (11) completely or partly condensing. The condensate (12) is collected in the collecting vessel (29).

The plates (16) can be arranged in the condenser in parallel or concentrically.

In FIG. 2b, an embodiment having a parallel arrangement is shown which produces a symmetrical flow and represents an optimal space utilization. This solution is relatively complex in terms of construction, just as is the concentric arrangement.

The overhead vapors from the column body initially ascend in the heat exchanger (2) through the interior cavity (26) before they precipitate downwards at the plates (16).

In FIG. 3, a further constructional embodiment of the column according to the invention is shown. The function and designation of the individual elements corresponds to those according to FIGS. 2a and 2b. The asymmetric design according to FIG. 3 has flow relationships which are not so favorable compared to the construction of FIGS. 2a and 2b; on the other hand, this construction is simpler to realize.

The embodiments shown in FIGS. 1 to 3 can also be arranged without difficulty between two trays or packing beds within a column body (1). In this case, the heat exchanger (2) is integrated into the column body (1) asymmetrically or symmetrically between two trays and/or packing beds within a collecting vessel (29) open at the top. Instead of the deflection of the vapors to be condensed at the column head, in this embodiment a deflection of at least some of the vapors takes place at the tray lying above or the packing lying above. This configuration of the column is particularly preferred if a specific condensation of vapors which ascend between two trays and/or packing beds is desired. This measure is particularly applied in the context of energy saving or in the case of vaporous side-cuts to be condensed.

In FIG. 4, a further preferred embodiment of the column according to the invention is shown, in which a heat exchanger (2) is arranged in the column body (1) asymmetrically between two trays (30) or packing beds within a collecting vessel (29) open at the top. Collecting vessel (29) and heat exchanger (2) are installed in the interior of the column shell (40). The vapors (11) ascending from the lower tray (30) or the packing bed are conducted past the heat exchanger (2), which is constructed as a plate heat exchanger in the form shown, to the tray (30) lying above or to the packing bed lying above. The liquid (31) situated here is run off via an outlet nozzle (32) and passed to the collecting vessel (29) via a feed line (33) or optionally taken off from the column altogether. Control of these diverse liquid streams is expediently carried out by means of the valves (36) and (38). In the form shown in FIG. 4, the heat exchanger (2) is operated as an evaporator. For this purpose, the liquid (31) from the higher parts of the column is returned at least in part to the collecting vessel (29) and preferably covers the plates (16) completely as liquid (12). The heat exchanger (2) is supplied a heating medium via the feed and outlet lines (34) and (35), for example with condensing superheated steam or with hot water. The liquid (12) is partly evaporated and the vapor leaves the collecting vessel (29) via its top opening and is passed to the tray (30) or packing bed lying above together with the vapors (11) ascending from the lower tray or packing bed. The liquid (12) which is not evaporated is passed from the collecting vessel (29) via the outlet nozzle (41) to the lower tray (30) or the packing bed. For this purpose an outlet line (42), designed in particular as a siphon, is used which opens out into a distributor (43).

In a further development of the column as described in FIG. 4, liquid (31) is continuously supplied from the trays (3) or packing beds lying above the heat exchanger (2) to the collecting vessel (29) and the heat exchanger (2) is operated as a cooler, that is it is fed with coolant, for example with coolant water, via the feed and outlet lines (34) and (35). In the collecting vessel (29), the liquid (12) is cooled and, after filling the collecting vessel, flows off via the outlet nozzle (41) in the direction of the trays or packing beds lying beneath. This development of the column according to the invention is suitable in particular during operation as an absorption column.

We claim:

1. A column including a column body and at least one heat exchanger installed within the column, which heat exchanger is operated as an evaporator, which comprises the heat exchanger being a plate heat exchanger which is installed between two trays within a collecting vessel open at the top and installed in the bottom.

2. The column as claimed in claim 1, wherein this has at least one connection to a vacuum system.

3. The column as claimed in claim 1, wherein the plate heat exchanger is installed in the bottom and is operated as an evaporator.

4. The column as claimed in claim 1, wherein the heat exchanger is operated as an evaporator and feed and outlet lines are provided by which liquid can be drained off from the tray lying above and fed to the collecting vessel.

5. The column as claimed in claim 1, wherein the heat exchanger is operated as a cooler and feed and outlet lines are provided by which at least some of the liquid present in the tray lying above or the packing bed lying above can be drained off from this tray or this packing bed and can be fed to the collecting vessel.

6. A column including a column body and at least one heat exchanger installed between two trays within the column, which heat exchanger is operated as a condenser, comprising the heat exchanger being a plate heat exchanger which is integrated into the column body within a collecting vessel open at the top between the two trays in the interior of the column body, so that vapors ascending from a lower tray are conducted past the heat exchanger and are deflected at least in part by 180° at the tray lying above, and then impinge onto the condenser plate where they precipitate as condensate and move downwards together with the vapors to be condensed.

7. The column as claimed in claim 6, wherein this has at least one connection to a vacuum system.

8. A column including a column body and a head and at least one heat exchanger with condenser plates installed directly on the column head, the heat exchanger comprising a plate heat exchanger constructed and arranged so that overhead vapors ascending from the column body are conducted through an internal cavity and are deflected through 180° at the top of the exchanger and then impinge on the condenser plates, where they precipitate as condensate and move downwards together with the vapors to be condensed, and wherein the plate heat exchanger is mounted in the upper part of the column.

9. The column as claimed in claim 8, wherein this has at least one connection to a vacuum system.

10. The column as claimed in claim 8, wherein a reflux line is provided which permits the condensate to be returned at least in part to the column body.

11. The column as claimed in claim 10, wherein the reflux line is designed in the form of a siphon.

12. The column as claimed in claim 8, wherein a reflux line is provided which permits dilution of the bottom product with condensate.

13. The column as claimed in claim 8, wherein the heat exchanger is a plate heat exchanger, the condenser plates of which are arranged in parallel to each other.

14. A column including a column body and at least one heat exchanger installed between two packing beds within the column, which heat exchanger is operated as a condenser, comprising the heat exchanger being a plate heat exchanger which is integrated into the column body within a collecting vessel open at the top between the two packing beds in the interior of the column body, so that vapors ascending from a lower packing bed are conducted past the heat exchanger and are deflected at least in part by 180° at the packing bed lying above, and then impinge onto the condenser plate where they precipitate as condensate and move downwards together with the vapors to be condensed.

15. The column as claimed in claim 14 having at least one connection to a vacuum system.

16. The column as claimed in claim 14, wherein a reflux line is provided which permits dilution of the bottom product with condensate.

* * * * *